United States Patent [19]

Kumagami et al.

[11] Patent Number: 4,822,967

[45] Date of Patent: Apr. 18, 1989

[54] APPARATUS FOR STERILIZING SEALED FOOD STUFFS BY MICROWAVE IRRADIATION

[75] Inventors: Naoki Kumagami; Yoshihiro Nakagawa; Atsushi Yuzawa; Kiichiro Hirose; Yukie Sato; Akihiro Shiosaka, all of Tokyo, Japan

[73] Assignee: Toppan Printing Co., Ltd., Japan

[21] Appl. No.: 163,618

[22] Filed: Mar. 3, 1988

[30] Foreign Application Priority Data

Mar. 10, 1987 [JP] Japan .............................. 62-34758[U]
Mar. 23, 1987 [JP] Japan .............................. 62-42335[U]
Mar. 23, 1987 [JP] Japan .............................. 62-42336[U]
Oct. 7, 1987 [JP] Japan .............................. 62-153830[U]

[51] Int. Cl.$^4$ .............................................. H05B 6/78
[52] U.S. Cl. ...................... 219/10.55 F; 219/10.55 A; 219/10.55 E; 422/186.2; 422/307; 99/DIG. 14; 414/758
[58] Field of Search ................. 219/10.55 R, 10.55 A, 219/10.55 F, 10.55 E; 99/DIG. 14, 451; 414/758, 759, 760; 422/258, 259, 269, 270, 285, 307, 186.2

[56] References Cited

U.S. PATENT DOCUMENTS

| | | | |
|---|---|---|---|
| 3,098,554 | 7/1963 | Zeligowsky | 414/759 X |
| 3,261,140 | 7/1966 | Long et al. | 219/10.55 |
| 3,335,253 | 8/1967 | Jeppson et al. | 219/10.55 |
| 4,095,700 | 6/1978 | Chiuaru et al. | 414/759 |
| 4,503,307 | 3/1985 | Campbell et al. | 219/10.55 E |
| 4,571,474 | 2/1986 | Pomroy | 219/10.55 F |
| 4,652,712 | 3/1987 | Zeipel | 219/10.55 F |
| 4,714,813 | 12/1987 | Trenchard | 219/10.55 F |

FOREIGN PATENT DOCUMENTS

5826949 6/1958 Japan .

Primary Examiner—Philip H. Leung
Attorney, Agent, or Firm—Lerner, David, Littenberg, Krumholz & Mentlik

[57] ABSTRACT

The present invention provides a microwave heating sterilizer provided with a mechanism for turning over a retainer made from a material being permeable to microwave and which contains a "material to be sterilized" in a cavity irradiated with microwave therein supporting shafts extend from positions determined at point symmetry with respect to the center of the retainer on the opposite ends thereof, and turning-over parts each having a higher slide surface than the other part thereof on the midway of a guide which conveys the retainer and a turning-over groove on the midpoint thereof are provided.

13 Claims, 6 Drawing Sheets

APPARATUS FOR STERILIZING SEALED FOOD STUFFS BY MICROWAVE IRRADIATION

FIELD OF THE INVENTION

This invention relates to a microwave sterilizer used for the sterilizing treatment of sealed foodstuffs may means of microwave irradiation.

DESCRIPTION OF THE PRIOR ART

Heretofore, as such type of a sterilizer for sterilizing sealed foodstuffs by means of microwave as described above, a sterilizer having such construction that a foodstuff (hereinafter referred to as "material to be sterilized") which has been packed and sealed is contained in a pressure container (hereinafter referred to simply as "retainer") made from a material permeable to microwave, and the retainer as described above is placed in a cavity and irradiated with microwave, whereby the material to be sterilized in the retainer can be sterilized has been proposed as disclosed in Japanese Patent Publication No. 26949/1983, and such sterilizer has been put to practical use.

For example, U.S. Pat. Nos. 3,261,140 and 3,335,253 disclose an apparatus for heating or sterilizing sealed foodstuffs by irradiating them with microwave while transferring continuously said sealed foodstuffs.

While technique for heating and sterilizing "materials to be sterilized" by means of microwave has been disclosed by the above described matters of prior art, respectively, all the prior techniques describe merely irradiation of "materials to be sterilized" with microwave, and insufficient heating in the irradiation has not been mentioned.

Generally, in sterilization, when heating is insufficient, stable sterilization effect cannot be obtained.

On the other hand, when materials are irradiated excessively with microwave for the sake of preventing insufficient sterilization, excessively heated portions appear so that there is a fear of deterioration of the "materials to be sterilized". In order to prevent such excessive heating as described above and to homogeneously heat "materials to be sterilized," it was tried to irradiate the materials with microwave in accordance with an interval or scanning manner.

In either manner, however, there is a heating nonuniformity due to irradiation of materials with microwave along only one direction in its microwave irradiating part, and as a result, the materials cannot be uniformly sterilized. Furthermore, there was also such problem that when the materials were irradiated with microwave in a static state, a surface to be irradiated was uniformly heated, but its heating efficiency was poor.

OBJECT OF THE INVENTION

The present invention has been made in view of the above, and an object of the present invention is to provide a microwave heating sterilizer by which "materials to be sterilized" can be homogeneously and continuously heated.

More specifically, this object of the present invention is to provide a microwave sterilizer by which sterilization can be effected for a short period of time which is a characteristic feature of microwave irradiating sterilization, and temperature differences in respective parts are made minimum at the time when microwave irradiation (sterilization) is completed with respect to "materials to be sterilized" in a package as a matter of course, differences in temperature rise in the respective parts in the course of sterilization are also made minimum.

SUMMARY OF THE INVENTION

The present invention concerns a microwave heating sterilizer wherein a package which is prepared by charging a tray or pouch made of a material permeable to microwave with a foodstuff being a substance to be sterilized and sealing the tray or pouch thus charged is irradiated with microwave while conveying continuously the same, characterized in that said package is first irradiated with microwave by means of a waveguide, then the package is turned over and irradiated with microwave.

More specifically, the present invention relates to a sterilizer wherein a retainer made from a material being permeable to microwave and heat-resistant and which contains a "material to be sterilized" is conveyed in and passed through a cavity being irradiated with microwave through a waveguide, comprising such construction that said retainer is made possible to be turned over in the course of the conveyance thereof. Namely, the construction involves supporting shafts extending from the positions determined at point symmetry with respect to the center of said retainer on the opposite end portions thereof, and turning-over parts each having a higher slide surface than the other part during conveyance of said retainer and a turning-over groove.

DETAILED DESCRIPTION OF THE INVENTION

Figure 1:
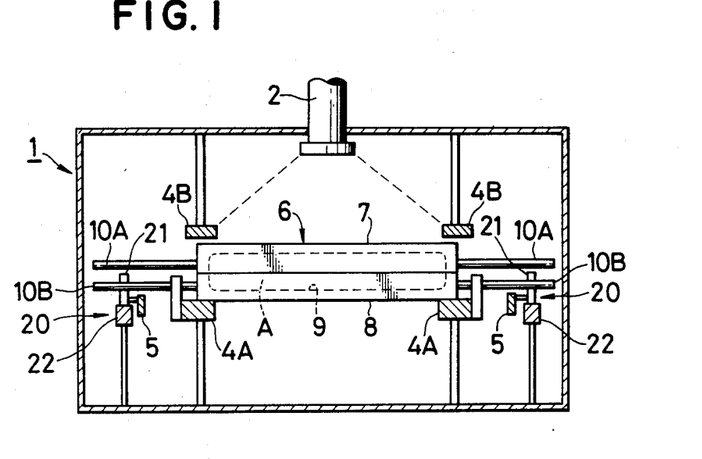
FIG. 1 is a schematically sectional view showing an example of the microwave sterilizer according to the present invention.
Figure 2:
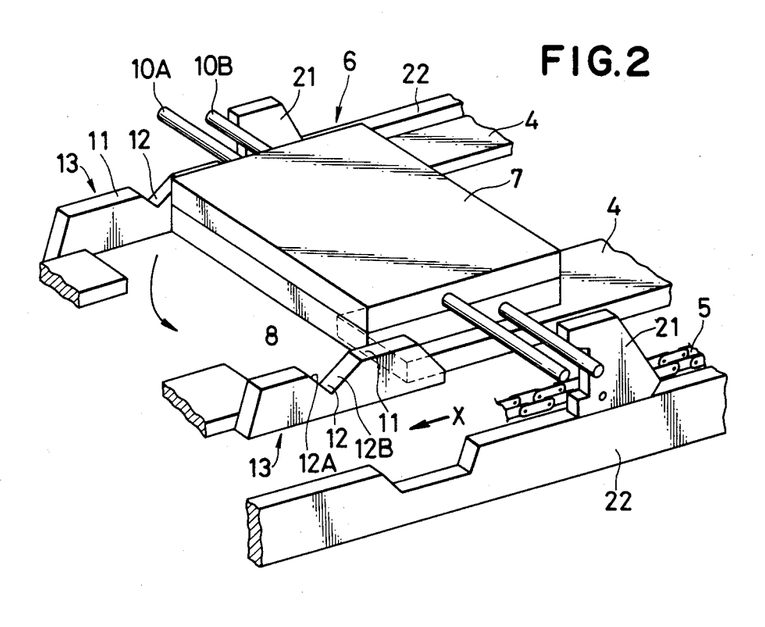
FIG. 2 is a schematically perspective view showing a turning-over mechanism of a retainer.

The microwave heating sterilizer according to the present invention is of a construction shown schematically in FIG. 1 wherein reference numeral 1 designates a cavity, and 2 designates a waveguide emitting downwardly microwave into the cavity 1. Inside the cavity 1, conveying parts 20 and 20 for continuously transferring a retainer which will be described hereinbelow along the horizontal direction X are disposed on the lower opposite sides thereof. The conveying part 20 is composed of a guide rail 4 and a driving chain 5 extending along the inside of the guide rail 4. The driving chain 5 is made of polyacetal or the like which does not leak microwave. Further, the retainer 6 is composed of two plate-like members 7 and 8 each of which is made from a material being permeable to microwave and heat-resistant such as silicon, glass fiber filled silicon, ceramics or the like. The retainer 6 contains a "material to be sterilized" A being a sealed foodstuff in a containing part 9 formed by joining these two plate-like members 7 and 8. Supporting shafts 10A and 10A as well as 10B and 10B extend from positions determined at point symmetry with respect to the center of the retainer 6 on the opposite end surfaces thereof. As shown in FIG. 2, the guide rail 4 is positioned outside the retainer main body at a turning round position and is provided with a turning-over part 13 the opposite sides thereof being inclined and having a higher slide surface 11 and a turning-over groove 12.

The conveying part 20 has such a construction that attachments 21 abutting upon a supporting shaft of the retainer 6 are attached to the driving chain 5 with a given interval.

In this case, the attachment 21 is conveyed along an attachment guide 22 for restricting the conveying direction in the case when said attachment 21 is conveyed by means of the driving chain 5. A position of the turning-over part 13 in the guide rail 4 is lower than the other part thereof.

Figure 3A:
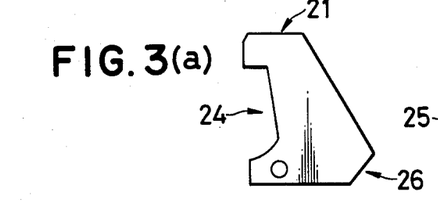
FIGS. 3(a) and (b) are explanatory views each showing the construction of an attachment.
Figure 3B:
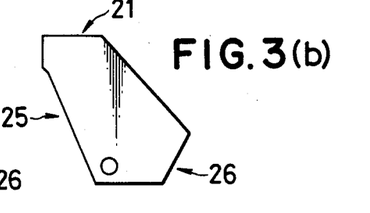

And the attachment 21 is rotatably attached to the driving chain 5, and as shown in FIG. 3(a) or (b), either a notched portion 24 is defined on the lower part of the abutting surface on the abutting side of the attachment 21, or an inclined portion 25 is formed on said lower part of the abutting surface, whereby said notched portion 24 or said inclined portion 25 pushes only either of supporting shafts 10A and 10B of the retainer 6 during turning-over operation, whilst said portion 24 or 25 does not abut upon the other supporting shaft. The attachment 21 has further another notch 26 having substantially the same angle as that of the turning-over groove 12 on the conveying side on the lower part of the back thereof.

Next, the turning-over mechanism will be described by referring to the accompanying drawings.

Figure 4A:
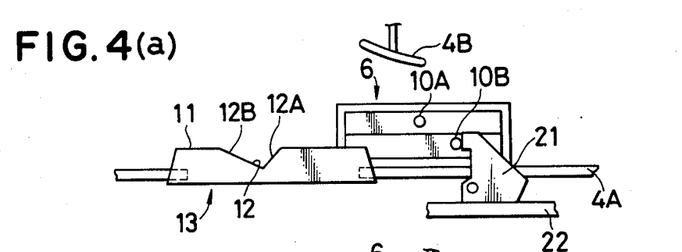
FIGS. 4(a), (b), (c) and (d) are explanatory views each showing a retainer in a turning or turned over state.

As shown in FIG. 4(a), first of all horizontal conveyance is effected in such that the retainer 6 is positioned over the guide rail 4, and the attachment 21 abuts against the lower supporting shaft 10B.

Figure 4B:
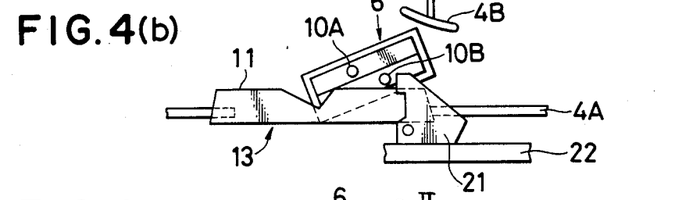
Figure 4C:
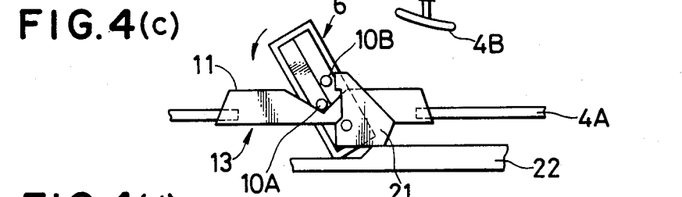

At the position of the turning-over part 13 as shown in FIG. 4(b), the retainer 6 does not abut upon the slide surface 11, but the supporting shaft 10B abuts upon said slide surface, so that the supporting shaft 10A positions ahead of the supporting shaft 10B and the retainer 6 descends. When the supporting shaft 10A enters the turning-over groove 12 as shown in FIG. 4(c), the retainer 6 is turned over in such that the supporting shaft 10B becomes ahead of the supporting shaft 10A as a result of shift of the center of gravity of the retainer 6 while leaving the attachment 21 to push the supporting shaft 10B.

Figure 4D:
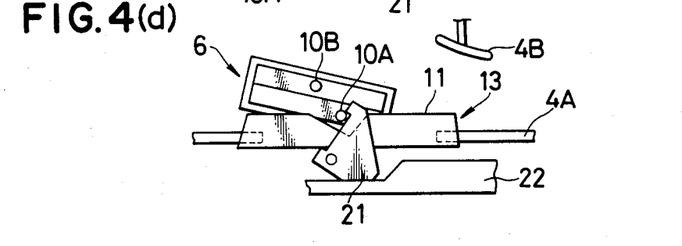

In this case, the attachment 21 is positioned on the lower portion of the attachment guide 22 as shown in FIG. 4(d) and pushes the retainer 6 up along the profile of the turning-over groove 12 to be in a complete turned over state.

In this case, it is preferred that an angle of the front surface of the attachment 21 is substantially 90° with respect to an inclined surface 12A defining the truning-over groove 12 of the turning-over part 13.

When the construction of the attachment 21 is made to have a notch 26 with an angle of substantially 90° which is defined by an inclined surface 12B of the turning-over groove 12 and the inclined side 25 in the front of the attachment 21, more specifically, when the angles of the inclined surfaces 12A and 12B are made to be 60° and 30°, respectively, a turning-over operation in the turning-over groove and conveyance from the turning-over groove become to be smoothly possible so that it is very efficient in the case where angles of the inclined sides 25 and 26 of the attachment are 15° and 45°, respectively. Furthermore, when an upper guide rail 4B is disposed over the guide rail 4 other than said turning-over part 13, its turning-over operation can be smoothly carried out.

Figure 5:
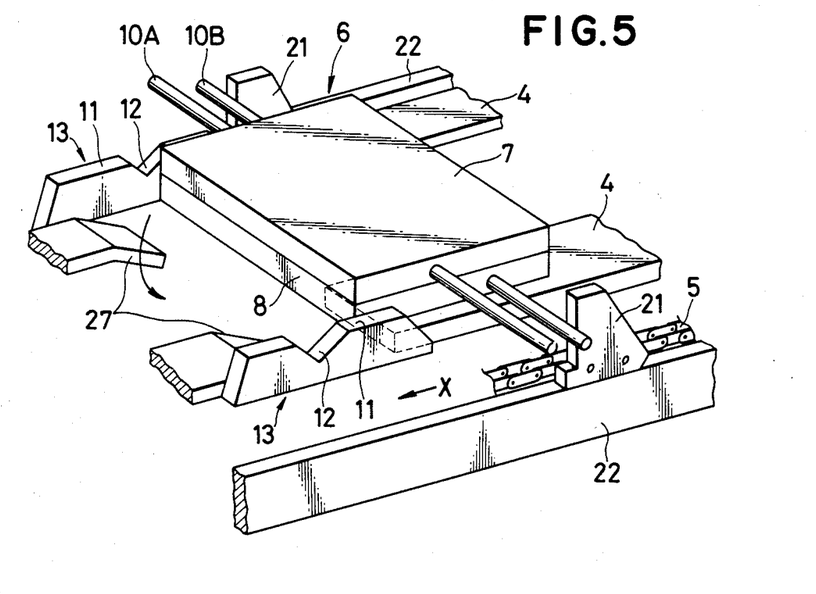
FIG. 5 is a schematically sectional view showing a sterilizer in which each attachment is adapted to be horizontally shifted always and each receiving part is disposed in the front of each turning-over part.

Moreover, as other modifications, no lower portion may be defined at the position of the turning-over part 13 of the attachment guide 22 as shown in FIG. 5 in order to continuously transfer the attachment 21 in horizontal direction. Alternatively, a receiving part 27 which extends downwards and obliquely in front of the turning-over part 13 of the guide rail 4 may be provided. In this case, when the attachment 21 is fixed to the chain at two points, it can prevent that the attachment 21 rotates around its stationary shaft as the center during revolution of the attachment 21 along the chain, so that it is efficient.

Figure 7A:
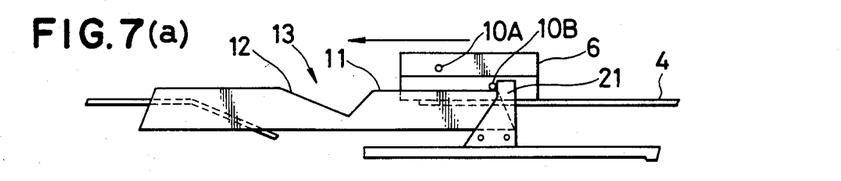
FIGS. 7(a), (b), (c), (d), (e) and (f) are schematically explanatory views each showing a turning-over mechanism of the retainer in the sterilizer of FIG. 5.

The turning-over mechanism of the present sterilizer is shown in FIGS. 7(a)–(e). First of all, the retainer 6 positions on the guide rail 4 in the case where the retainer 6 is horizontally conveyed on the slide surface 11 at the turning-over part 13 as shown in FIG. 7(a), and the attachment 21 abuts upon the lower supporting shaft 10B on the slide surface 11, whereby the conveyance is effected.

Figure 7B:
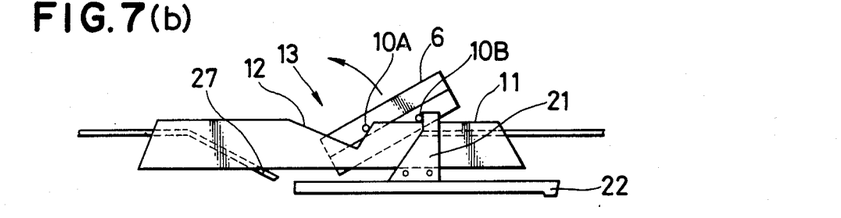
Figure 7C:
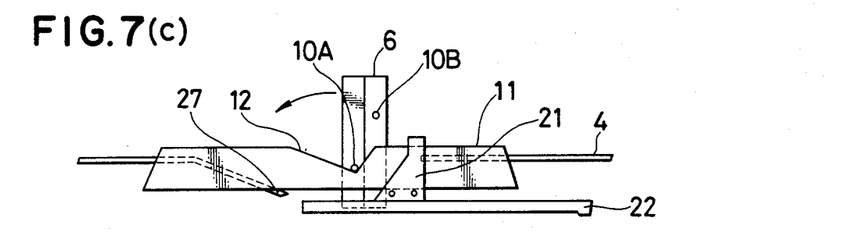

And as shown in FIG. 7(b), the supporting shaft 10A is ahead of the supporting shaft 10B and the retainer 6 descends at the position where the supporting shaft 10A is conveyed to the turning-over groove 12 of the turning-over part 13, so that the retainer 6 rotates forwardly in the turning-over groove 12, and there is a state where the attachment 21 is distant from the supporting shaft 10B as shown in FIG. 7(c).

Figure 6A:
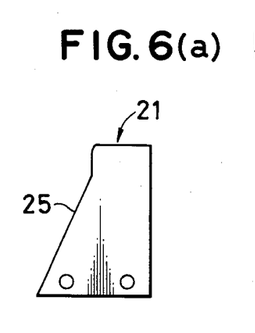
FIGS. 6(a) and (b) are explanatory views each showing a construction of the attachment used in the sterilizer of FIG. 5.
Figure 6B:
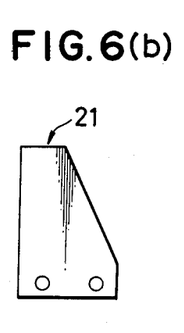
Figure 7D:
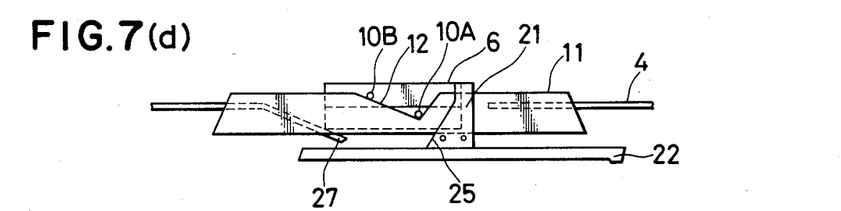
Figure 7E:
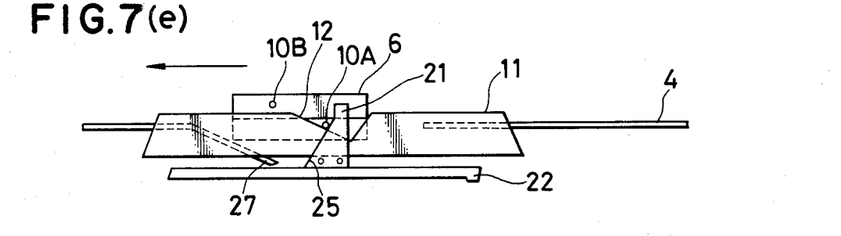
Figure 7F:
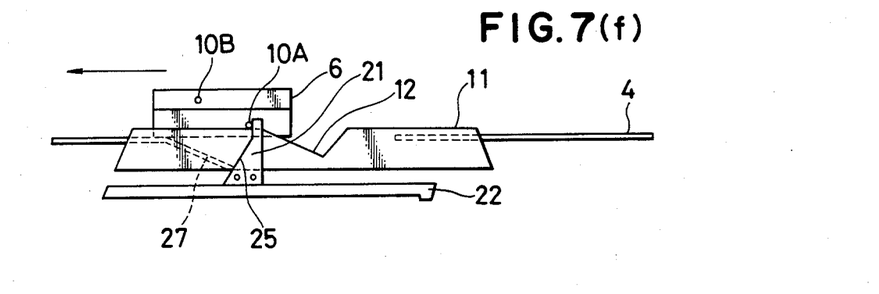

In this case, the front end of the retainer 6 rotated about against the receiving part 27 to keep a turned over state, and at the same time a condition where the supporting a shifts 10A and 10B are in contact with the inclined surface of the turning-over groove 12, respectively, is attained as shown in FIG. 7(d). And as shown in FIG. 7(e), the retainer 6 is pushed up along the profile of the turning-over groove 12 by means of the inclined surface 25 of the attachment 21, and the retainer 6 is conveyed while maintaining the turned over state thereof as shown in FIG. 7(f). In the above case, the profile of the attachment 21 may be the one shown in FIG. 6(a), besides the one in which no inclination is formed on the surface against which the supporting shafts 10A and 10B abut as shown in FIG. 6(b), and the retainer 6 can be, of course, conveyed by the latter profile of said attachment 21.

A sealed foodstuff in the retainer is irradiated with microwave to sterilize the foodstuff while repeating the above-mentioned operations in its cavity with a required number of times.

In the turning-over groove 12 of the above case, if the angle of the inclined surface for pushing up the retainer is made substantially equal to that of the receiving part 24, the retainer 6 can be smoothly conveyed after turning over the same.

Figure 8:
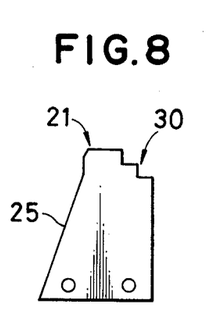
FIG. 8 is an explanatory view showing the construction of another attachment.

In the case when any accident or the like takes place in the cavity, it is required to shift the retainer in the opposite direction to the conveying direction. Accordingly, it is preferable to define a stepped notch 30 on the rear upper portion of the attachment 21 on the side opposite to the abutting surface thereof as shown in FIG. 8.

In case of requiring reverse transfer of the retainer 6, when the attachment 21 is reversed, supporting shafts 10A and 10B of the following retainer 6 run on the notch 30 of the attachment to make the retainer 6 possible to transfer in the opposite direction.

The retainer used in the present invention will be described hereinbelow by referring to FIG. 9 to FIG. 12.

Figure 9:
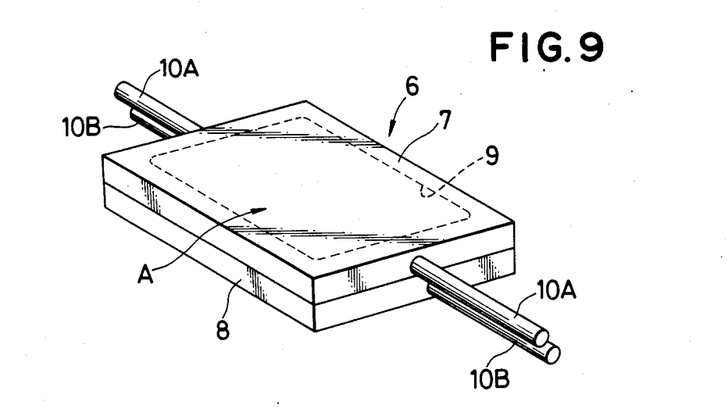
FIG. 9 to FIG. 12 are explanatory views each showing an example of the supporting shafts of the retainer according to the present invention.

The retainer according to the present invention is composed of two plate-like members 7 and 8 each of which is made from a material being permeable to microwave and heat-resistant such as silicon, glass fiber filled Teflon, ceramics or the like as shown in FIG. 9. The retainer contains a "material to be sterilized" A being a sealed foodstuff in a containing part 9 formed by joining these two plate-like members 7 and 8, and the sterilization is effected while remaining the "material to be sterilized" A contained in the containing part 9. Columnar supporting shafts 10A and 10A as well as 10B and 10B extend from positions determined at point symmetry with respect to the center of the retainer on the opposite end surfaces thereof.

Figure 10:
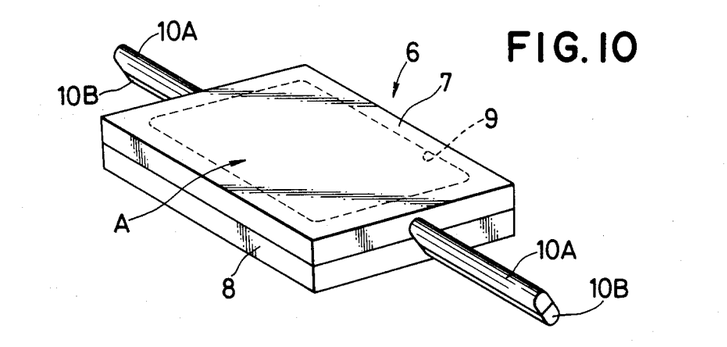
Figure 11:
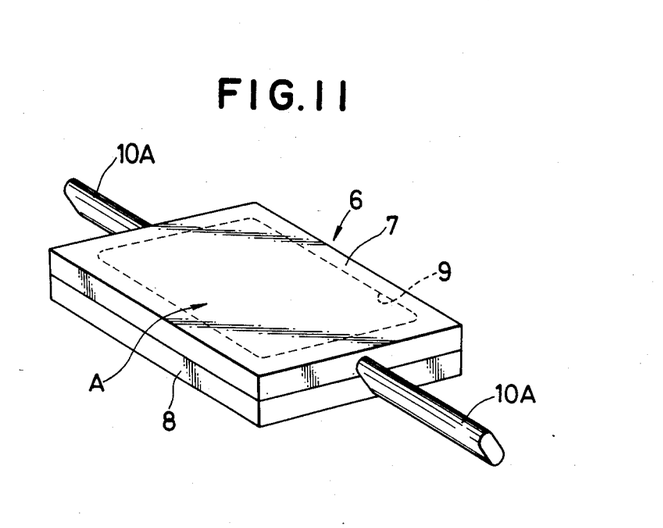
Figure 12:
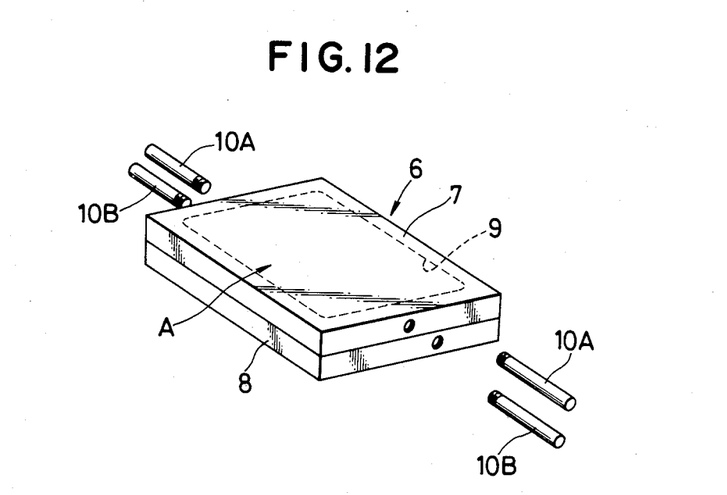

These supporting shafts may be not columnar, but plate-like supporting shafts 10A and 10A as well as 10B and 10B each end portion of which may be formed into a circular arc as shown in FIG. 10. Furthermore, such supporting shaft 10A and 10A having point symmetrical profile may be disposed on only either of the plate-like members 7 and 8 as shown in FIG. 11.

In the above case, these supporting shafts may be either integrally formed on the plate-like members by means of injection molding or the like manner, or the supporting shafts 10A, 10A, 10B and 10B may be separately fabricated and they may be joined to the plate-like members by means of threaded engagement or the like manner.

The retainer is irradiated with microwave to sterilize the sealed-foodstuff in its cavity of the aforementioned heating sterilizer while turning over the retainer with a required number of times.

As apparent from the above description, since the retainer which is continuously conveyed in its cavity is reversed in the course of conveyance according to the present invention, such excellent advantages that a material to be sterilized contained in the retainer can be uniformly heated, and further that its heating efficiency can be elevated, because agitating action of the air in the cavity due to turning-over of the retainer makes atmosphere in the cavity to be the one having a uniform temperature distribution are attained.

Furthermore, by means of such construction that a profile of the turning-over groove is defined in V-shape, and the inclined surface of the turning-over groove is arranged so as to form substantially 90° angle with respect to the inclined side in the front of the attachment, the retainer can be more smoothly turned round in the turning-over groove, and the retainer can also be smoothly conveyed from the turning-over groove.

Moreover, in case of turning over the retainer, if a receiving part is disposed in the forward direction, such an accident that supporting shafts are broken because of the inertia of turning-over of the retainer can be prevented, besides such retainer turned over can smoothly be conveyed from the turning-over groove, and transferred to the succeeding step.

We claim:

1. A microwave heating apparatus comprising a retainer made of a material permeable to microwave and heat-resistant for containing a material to be sterilized, conveying means for conveying said retainer through a cavity being irradiated with microwave through a wave guide in a longitudinal direction, a conveying surface for slideably supporting said retainer during conveyance, supporting shaft means extending from said retainer on opposite sides of said retainer transverse to said longitudinal direction, said supporting shaft means including an upper slide surface and a lower slide surface, said upper surface being offset in said longitudinal direction with respect to said lower slide surface, retainer guide rail means having a turning-over part for operative association with said supporting shaft means to invert said retainer as it is conveyed through said cavity, said turning-over part having a turning-over groove with a first inclined surface and a second inclined surface, said turning-over groove being adapted to receive said upper slide surface of said supporting shaft means and subsequently receive said lower slide surface of said supporting shaft means to facilitate the inversion of said retainer during conveyance of said retainer through said cavity.

2. The microwave heating apparatus claimed in claim 1, wherein said conveying means includes a conveying attachment having an abutment surface for successively abutting said lower slide surface and said upper slide surface to thereby facilitate the conveyance and inversion of said retainer.

3. The microwave heating apparatus as claimed in claim 2, wherein said conveying means includes a conveying member, said conveying attachment being pivotally attached to said conveying member.

4. The microwave heating apparatus as claimed in claim 3 wherein a stepped notch is defined at the upper part in the rear of said conveying attachment.

5. The microwave heating apparatus as claimed in claim 3, wherein said conveying surface has a first portion on which said retainer slides prior to inversion and a second portion for receiving said retainer after inversion, and said turning-over part includes a turning-over area between said first portion and said second portion to permit the inversion of said retainer between said first portion and said second portion.

6. The microwave heating apparatus as claimed in claim 3, wherein said conveying means includes an attachment guide have a first guide surface and a recessed guide surface, said conveying attachment having a first attachment surface for slideable contact with said first guide surface when said conveying attachment abuts said lower slide surface of said supporting shaft means and an inclined surface for slideable contact with said recessed guide surface after the retainer has been substantially inverted, said inclined surface having substantially the same angle as the first inclined surface of said turning-over groove when said first attachment surface is in contact with said first guide surface.

7. The microwave heating apparatus as claimed in claim 6 wherein a stepped notch is defined at the upper part in the rear of said conveying attachment.

8. The microwave heating apparatus as claimed in claim 6, wherein said abutment surface of said conveying attachment has a first abutting portion for abutting said lower slide surface of said turning-over part prior to inversion of said retainer and a notch portion for abutting said upper slide surface when said inclined surface of said conveying attachment contacts said recessed guide surface.

9. The microwave heating apparatus as claimed in claim 6, wherein said abutment surface of said conveying attachment has an inclined abutting surface descending outwardly from top to bottom of said conveying attachment.

10. The microwave heating apparatus as claimed in claim 3, wherein said abutment surface of said conveying attachment has an inclined abutting surface descending outwardly from top to bottom of said conveying attachment.

11. The microwave heating apparatus as claimed in claim 1, wherein said conveying surface has a first portion on which said retainer slides prior to inversion and a second portion for receiving said retainer after inversion, and said turning-over part includes a turning-over area between said first portion and said second portion to permit the inversion of said retainer between said first portion and said second portion.

12. The microwave heating apparatus as claimed in claim 11, wherein said second portion of said conveying surface includes a downwardly depending inclined surface adjacent said turning-over area for receiving said retainer after inversion.

13. The microwave heating apparatus as claimed in claim 12, wherein said second inclined surface of said turning-over groove is adjacent to said second portion of said conveying slide surface and has an angle which is substantially the same as the angle of said downwardly depending surface of said second portion.

* * * * *